United States Patent Office 3,667,966
Patented June 6, 1972

3,667,966
YEAST RAISED BAKED PRODUCTS AND
PREPARATION THEREOF
Albert Peter Centolella, Edwardsburg, Mich., and Billy
Gene Razor, Elkhart, Ind., assignors to Miles Laboratories, Inc., Elkhart, Ind.
No Drawing. Filed Nov. 3, 1969, Ser. No. 873,712
Int. Cl. A21d 2/14
U.S. Cl. 99—91                                                12 Claims

ABSTRACT OF THE DISCLOSURE

A yeast raised baked product and a method for preparing such a baked product utilizing a dough additive comprising a polyester of citric acid and sorbitol which imparts improved characteristics to the dough and the baked product resulting therefrom.

BACKGROUND OF THE INVENTION

This invention relates to a new yeast raised baked product and a method of preparing such a product. More particularly this invention relates to a composition incorporating a new dough additive comprising a polyester of citric acid and sorbitol or a pysiologically acceptable alkali metal or alkaline earth metal salt thereof, and a method of preparing such a composition. Further, this invention relates to an improved baked product which includes this new dough additive.

In preparing yeast raised baked products, doughs are usually formed from wheat flours. It is known that the properties of the final product are highly dependent upon the gluten in the flour. Furthermore, it is known that the gluten content, along with other attributes, can vary greatly from one flour to the next depending upon the geographical source and the growing season of the grain used to form the flour. To achieve a baked product having desirable volume, symmetry, grain, aroma, taste, texture, etc., it is necessary that the flour be mixed with water and other ingredients for the proper amount of time to correctly develop the gluten. Either undermixing or overmixing will develop a dough having undesirable features and a poor quality baked product.

For example, when bread doughs are properly mixed, the dough exhibits a smoothness, a maximum resistance to pull and a greatest degree of elasticity. However, if overmixed the dough becomes soft and sticky.

In the preparation of yeast raised baked products a variety of formulations or recipes and ingredients is available. However, in most of these products the basic ingredients and techniques are very similar and yield themselves well to a general consideration.

Formulations for preparing yeast raised baked products are readily available and well known in the bakery art. For instance a large number of recipes may be found in the book edited by Samuel A. Matz, entitled "Bakery Technology and Engineering" and published (in 1960) by The AVI Publishing Company, Inc. It is customary to state the ingredients in these recipes as amounts added to one hundred pounds of flour and to refer to such amounts as percents.

In breads, for example, the following variations in components are generally considered to be within accepted standards:

| Ingredient: | Percent |
|---|---|
| Flour | 100 |
| Water | 60–74 |
| Salt | 2–3 |
| Sugar | 3–4 |
| Milk | 2–12 |
| Shortening | 3–9 |
| Yeast | 1.75–4 |

To these basic quantities, other ingredients, such as malt syrup, butter, whole eggs, oxidation inhibitors, emulsifiers, dough improvers, etc. may be added to achieve a particular effect.

Bread doughs are generally prepared with a sponge dough method or continuous mix method. In each of these methods a sponge or liquid ferment is prepared including between about one-half and three-quarters of the flour, water, yeast, yeast foods, and other minor amounts of optional ingredients and allowed to stand between about three and five hours to permit a desired amount of development.

In a sponge dough method, the sponge is then combined with the balance of the ingredients for the baked product in a batch process to form the dough which is further developed, placed in pans, proofed and baked.

In a continuous mix method, the ferment is combined in a continuous process with the balance of the dough ingredients, developed into a dough and extruded into the bread pans. The extruded dough is then proofed and baked.

Besides the bread dough, which is often referred to as a roll dough, yeast raised baked products may be prepared from sweet doughs. These doughs are similar in their general characteristics to bread doughs except that they are much richer in shortening, milk and sugar, and often contain eggs, flavorings, nuts, nut pastes, fruits, etc. In the preparation of these doughs, the sugar, shortening, salt, eggs, malt and milk are creamed together until homogeneous, flour is added thereto and the water, in which the yeast has been dissolved, is then mixed in and the doughs developed. For these doughs, a fermentation period of about one and three quarters hours is usually sufficient. Of course, many variations in mixing procedures and basic recipes may be used to produce substantially the same end results.

To reduce the criticality of mixing in preparation of doughs and to enhance other properties of the dough and baked product produced therefrom, a small amount of some minor ingredient has been added to the dough. Such an ingredient has been variously described as an emulsifier, dough improver, conditioner, etc. The type of ingredient chosen imparted particular advantages to the dough and the baked product and often multiple advantages could be realized by combining several ingredients. However, if multiple ingredients were required, additional dough preparation time was often involved and a greater chance of improper formulation was present. Some of these ingredients, although functioning well, were expensive even in the small quantities used. Since few of these ingredients functioned adequately by themselves, the choice of single ingredients available for incorporation in doughs has been very limited.

OBJECTS AND SUMMARY OF THE INVENTION

Therefore, it is an object of this invention to provide for use in a new yeast raised baked product a single inexpensive dough additive.

A further object of this invention is to provide a new yeast raised dough having substantially consistent properties in spite of variations in flours, mixing time, handling, etc.

Another object of this invention is to provide a yeast raised dough which, in spite of variations in mixing, ingredients and other conditions, consistently results in a baked product with desirable properties.

A still further object of this invention is to provide a method of preparing a yeast raised dough which has substantial flexibility in the processing steps.

Yet another object of this invention is to provide a method of retarding the staling of a baked product prepared from a yeast raised dough.

These and other objects will become evident from the following more detailed description.

Surprisingly, it has been discovered that an improved yeast raised baked product may be prepared by incorporating into the dough an additive comprising a polyester of citric acid and sorbitol. Furthermore, baked products incorporating this dough additive are found to be superior to control products in which it is not included. This additive improves the external qualities of the baked products prepared according to this invention. For example, the grain, texture, aroma, taste, etc. of products using this additive are superior to control products in which it is not included. Another advantage of this dough additive is that its inclusion substantially reduces the energy required for mixing. A further advantage is a substantial reduction in the staling characteristics of a baked product in which such additive is used.

DESCRIPTION OF THE PREFERRED EMBODIMENT

It has been unexpectedly discovered that a substantial improvement in a yeast raised baked product may be realized by incorporating in the dough at least about 0.125% of a dough additive comprising a polyester of citric acid and sorbitol or a physiologically acceptable salt thereof. Preferably, the amount of dough additive used is between about 0.25% and 0.5%. The ratio of citric acid to sorbitol in the polyester may be between about 1:2 and 2:1. It will be recognized that in spite of the beneficial results realized with such low concentrations, higher concentrations of this dough additive may be used.

Since these dough additives are used in very minor amounts, they may be added to the dough in any convenient manner. Preferably, they are introduced into the water-yeast mixture of the sponge stage. In this way a substantially uniform distribution within the final dough is achieved. Since these polyesters are soluble in water, this technique provides a convenient method of utilizing these dough additives.

These dough additives may also be dispersed throughout the flour, added as a separate ingredient to the dough, added as a separate ingredient to the sponge or incorporated at any other convenient time in the preparation of the dough.

The form of the dough additive is not considered critical, although it has been found advantageous to prepare the dough additive as a fine powder having size characteristics similar to flour or finer. The fine powder may be produced, for example, by grinding the crystalline polyester using known methods, by preparing the polyester in a rotatable vessel including metal balls for mixing and grinding or by spray drying a solution of a salt of the polyester.

The bread additive may be prepared by heating an aqueous solution of citric acid and sorbitol under subatmospheric pressure. Subatmospheric pressure is used since no significant esterification occurs at atmospheric pressure. Preferably an aqueous solution of the sorbitol is prepared and the citric acid combined therewith. The resulting mixture is heated, preferably with stirring, under subatmospheric pressure. Advantageously, the water of esterification is drawn from the reaction vessel during the reaction. The state of the reaction or degree of esterification is determined by measuring the free carboxyl value of the reaction mixture. A suitable degree of esterification may be obtained by terminating the reaction when the free carboxyl value is between 2.2% and 36.4% depending upon the molar ratio of the citric acid and sorbitol. At such termination values, saponification numbers for the free acid between 166 and 360 are obtained. Some representative values, related to molar ratios, of saponification numbers and percents free carboxyl are set forth in Table 1. Upon completion of the reaction, the reaction vessel is cooled. A crystalline product forms which may then be reduced to the desired degree of fineness.

TABLE 1

| Molecular ratio citric acid to sorbitol | Percent free carboxyl | Saponification number |
|---|---|---|
| 1:1 | 26.6–15.8 | 166–360 |
| 3:2 | 27.0–22.4 | 258–360 |
| 2:1 | 36.4–28.3 | 218–308 |
| 2:3 | 11.2–7.1 | 279–328 |
| 1:2 | 9.3–2.2 | 166–328 |

NOTE.—All values are for polyester as free acid.

It is believed that the number of ester bonds increases as the saponification number increases. The saponification number may be determined according to known analytical techniques. In one such technique, the percent free carboxyl of the polyester is first determined by titration with a solution of KOH using a phenolphthalein indicator. An additional known quantity of KOH solution is added to the resulting solution and, after refluxing, the solution is titrated with an acid solution.

This bread additive may similarly be formed in a ball mill autoclave under subatmospheric pressure.

In forming the bread additive, the reactants are advantageously heated to a temperature between about 135° C. and 160° C. until the desired degree of esterification is obtained. The reaction temperature is adjusted according to variables in the reaction, such as, desired chain length, ratio of citric acid to sorbitol, stage of reaction, etc. The reaction temperature is not considered critical so long as it does not exceed the decomposition temperature of the reactants. The particular subatmospheric pressure used in the reaction is also not considered critical; however, beneficial results have been obtained with pressures less than 582 mm. of Hg based on atmospheric pressure of 760 mm. Hg.

The bread additive may be in the form of the free acid polyester or a physiologically acceptable alkali metal or alkaline earth metal salt of the polyester. These salts may be prepared by neutralizing the polyester in a slurry or solution with a base, such as, calcium carbonate, calcium hydroxide, sodium carbonate, sodium hydroxide, and the like and then spray drying to form a solid. Alkali metals or alkaline earth metals such as sodium, potassium, calcium and other suitable metals from the Groups 1–A and 2–A of the Periodic Table may be used to form these salts.

Of course, after formation of the salt of the polyester the free carboxyl value will be reduced. The amount of the reduction in carboxyl value will vary according to the degree of neutralization and may be varied over a wide range of values.

A spray dried product is beneficially prepared from the solution of polyester salt. The solution may be formed by total or partial neutralization of the polyester free acid with a suitable base selected from those previously described. The amount of solids in this combination is not considered critical and may be varied depending upon the desired processing conditions and the desired bulk density of the final product. Preferably, the solution comprises between about 10 and 50 percent solids.

The spray drying equipment is not considered critical and may be selected from that which is currently available. A NERCO Utility Unit available from Nichols Engineering and Research Corporation, Copenhagen, Denmark has been used satisfactorily in the preparation of these salts. Such a drier has a concurrent flow of solution feed and air from the top of the enclosed unit with the discharge of final product being from the cyclone shaped bottom of the unit. With such a drier, it has been observed that a solution of the neutralized polyester acid may be supplied to the drier at a rate of between about 230 and 335 ml. per minute with an inlet gas temperature between about 165 and 210° C. With this unit there was a fixed feed rate of inlet gas of 300 cubic feet per minute. It is to be understood that these parameters are not considered critical and may be varied so that the critical parameter of outlet temperature is maintained.

Surprisingly, it has been found that a desirable salt may be obtained if the outlet temperature is maintained between 95 and 108° C. and preferably between 100 and 105° C. With these temperatures, a product having a preferred fineness is formed which is free flowing and has substantially the texture of sifted flour. When the outlet temperature is raised above 108° C. the dried salt tends to coat the sides of the drier and degrade. At an outlet temperature below about 95° C. a salt is formed which does not have the desired characteristics. Particularly, at the lower temperature the salt does not appear to be of sufficient dryness and tends to cake.

The desired salt is drawn from the base of the drier and collected in a cyclone type precipitator. The gas drawn from the drier with the salt is substantially, at this point, at its lowest temperature of the drying process. As the material is drawn from the drier it is substantially at its driest condition.

It is believed that some ethers may form in the preparation of polyesters having higher degrees of esterification. However, the preferred dough additives are substantially 100% polyesters or physiologically acceptable salts thereof.

Although these polyesters are preferably utilized in the form of physiologically acceptable alkali metal or alkaline earth metal salts, they may be combined, either as free acids or salts, with various adjuvants to achieve further alterations of their properties. For example, free-flowing characteristics may be adjusted by coating the polyester with stearic acid. Also the free-flowing characteristics of the powder may be modified with minor amounts of materials, such as a mixture of 55/45 palmitic to stearic acid or a mixture of mono- and diglycerides from the glycerolysis of edible fats or oils. Further, the polyester may be preblended with straight flour to form mixtures that are easily handled and incorporated into doughs.

This invention will be further understood by reference to the following detailed examples setting forth specific embodiments thereof.

EXAMPLE 1

Preparation of 1:2 molar ratio polyester of citric acid and sorbitol

D-sorbitol (91 g., 0.5 mole) was stirred with water (deionized, 39 ml.) and heated until a clear solution was formed. Citric acid (48 g., 0.25 mole) was added to the clear sorbitol-water solution in a pressure container. A pressure between 480 and 560 mm. of mercury was applied to the container through a concentrator condenser and the water vapor coming from the container was collected. The container was heated, as the solution was stirred, to a temperature of about 160° C. During the heating, samples were drawn from the reaction mixture and the free carboxyl value thereof determined. When a free carboxyl value of 9.4% was observed, the heating was terminated and the container cooled. A viscous material formed in the container which was poured into a shallow stainless steel pan and allowed to solidify. The resulting solid was ground to a fine powder.

Free carboxyl: 9.4%
Saponification number: 202.9

EXAMPLE 2

Preparation of 1:1.5 molar ratio polyester of citric acid and sorbitol

D-sorbitol (273 g., 1.5 moles) was stirred with water (deionized, 120 ml.) and heated until a clear solution was formed. Citric acid (192 g., 1 mole) was added to the clear sorbitol-water solution in a pressure container. A pressure between 450 and 530 mm. of mercury was applied to the container through a concentrator condenser and the water vapor coming from the container was collected. The container was heated, as the solution was stirred, to a temperature of about 145° C. During the heating, samples were drawn from the reaction mixture and the free carboxyl value thereof determined. When a free carboxyl value of 12.128% was observed, the heating was terminated and the container cooled. A viscous material formed, which was poured into a shallow stainless steel pan and allowed to solidify. The resulting solid was ground to a crystalline form.

Free carboxyl: 12.1%
Saponification: 290.6

EXAMPLE 3

Preparation of 2:1 molar ratio polyester of citric acid and sorbitol

D-sorbitol (18.2 lbs., 0.1 mole), citric acid (38.4 lbs., 0.2 mole) and water (deionized, 7.8 lbs.) were added to a ball mill autoclave. After five four-inch stainless steel balls were added to the autoclave, it was rotated at 36 r.p.m. A pressure between 124 and 288 mm. of mercury was applied to the autoclave and the steam jacket heated to a temperature of about 277° F. while the water of esterification was collected. During the heating, samples were drawn from the reaction mixture and the free carboxyl value thereof determined. When a free carboxyl value of 30.5% was observed, the heating was terminated and the autoclave cooled. After cooling, four additional stainless steel balls were added to the autoclave and it was rotated until the resulting product was ground to a fine powder.

Free carboxyl: 30.5%
Saponification number: 276.0

EXAMPLE 4

Preparation of 1:1 molar ratio polyester of citric acid and sorbitol

D-sorbitol (18.2 lbs., 0.1 mole), citric acid (19.2 lbs., 0.1 mole) and water (deionized, 7.8 lbs.) were added to a ball mill autoclave. After three four-inch stainless steel balls were added to the autoclave, it was rotated at 36 r.p.m. A pressure between 195 and 252 mm. of mercury was applied to the autoclave and the steam jacket heated to a temperature of about 240° F. while the water of esterification was collected. During the heating, samples were drawn from the reaction mixture and the free carboxyl value thereof determined. When a free carboxyl value of 15.8% was observed, the heating was terminated and the autoclave cooled. After cooling, two additional stainless steel balls were added to the autoclave and it was rotated until the resulting product was ground to a fine powder.

Free carboxyl: 15.8%
Saponification number: 328

EXAMPLE 5

Preparation of spray dried calcium salt of a polyester of citric acid and sorbitol A solution was prepared of 11.1 pounds of a 1:1 molar ratio polyester of citric acid and sorbitol (free carboxyl 16.2%) and 19 liters of deionized water. The solution had a final pH of 2. Calcium hydroxide (1.63 pounds) was added to the solution to yield a final pH of 5.5. The solution was stirred and filtered through a 100 mesh screen. A slight gain in volume was realized from washing the mixing equipment. The filtered solution was spray dried in a NERCO Spray Dryer (Nichols Engineering and Research Corp., Copenhagen, Denmark, Utility Unit). The solution was sprayed into the dryer through an atomizer revolving at 24,000 revolutions per minute. About 300 cubic feet per minute of inlet gas was injected into the dryer concurrently adjacent to the atomizer. The solids were drawn to and collected in a cyclone precipitator after drying.

The parameters for spray drying the 22 liters of 20.6% solids solution were as follows:

| Elapsed time (minutes) | Inlet temp., °C. | Outlet temp., °C. | Feed rate, ml./min. |
|---|---|---|---|
| 0 | 210 | 104 | 250 |
| 1 | 185 | 95 | 300 |
| 12 | 195 | 98 | 285 |
| 14 | 196 | 98 | 285 |
| 24 | 196 | 96 | 285 |
| 54 | 194 | 97 | 285 |
| 67 | 194 | 98 | 310 |

The resulting salt was a very fine, uniform and colorless powder.

Yield: 12.5 pounds (100%)
Free carboxyl: 1.84%
Saponification number: 223

EXAMPLE 6

Preparation of spray dried sodium salt of a polyester of citric acid and sorbitol A solution was prepared of 14.5 pounds of a 1:1 molar ratio polyester of citric acid and sorbitol (free carboxyl 20.9%) and 19 liters of deionized water. The solution had a final pH of 2.5. Sodium carbonate (1.65 kg.) was added to the solution to yield a final pH of 6.8. The solution was stirred and filtered through a 100 mesh screen. The filtered solution was spray dried in a NERCO spray dryer under substantially the same conditions as those in Example 5.

The parameters for spray drying the 23 liters of 29% solid solution were as follows:

| Elapsed time (minutes) | Inlet temp., °C. | Outlet temp., °C. | Total solution to drier |
|---|---|---|---|
| 0 | 195 | 107 | 0 |
| 8 | 185 | 103 | 1.8 |
| 14 | 185 | ¹85 | 3.8 |
| 28 | 197 | 107 | 8.0 |
| 41 | 198 | 108 | 11.0 |
| 53 | 198 | 106 | 13.0 |
| 73 | 190 | 105 | 18.8 |
| 83 | 198 | 108 | 20.3 |
| 88 | 198 | 108 | 20.8 |

¹ Blowing sides of spray dryer with revolving air jet.

The resulting salt was a very fine, uniform and colorless powder.

Yield: 14.5 pounds (91%)
Free carboxyl: 0.18%
Saponification number: 208

EXAMPLE 7

A 25 lb. flour mix was prepared according to the following formula wherein the constituents had the indicated proportions:

| Ingredient: | Percent |
|---|---|
| Flour | 100 |
| Yeast food | 0.5 |
| Sucrose | 9 |
| Salt | 2 |
| Shortening | 3 |
| Sodium propionate | 0.25 |
| Calcium bromate, potassium bromate and calcium phosphate | Trace amounts |
| Potassium bromate and calcium iodate | Trace amounts |
| Non-fat dry milk | 4 |

A sponge was prepared according to the following formula:

| Ingredient: | |
|---|---|
| Flour mix | 10 lbs. |
| Yeast, dry | 5 oz. |
| Water | 16 lbs. |
| Dough additive | As indicated. |

The sponge included 40% of the flour mix used in the final dough. The sponge was allowed to ferment for two hours and then the balance of the flour mix (15 lbs.) was added. The preparation of the sponge and dough were carried out with continuous mix equipment. The finished dough was extruded into 18–20 oz. portions, placed in baking pans and proofed for about 30 minutes in a temperature and humidity controlled proof box. The dough was baked for 35 minutes at 400° F. The baked product was evaluated and scored as set forth in Table 3. Samples 1 and 2 were control samples in which no dough additive was included. Samples 3, 4, 5, and 6 included a dough additive as stated in Table 2. Samples 2 and 4 each contained 0.5% of an emulsifier.

TABLE 2

| Sample | Percent used | Citric acid: sorbitol molar ratio | Percent free carboxyl | Salt |
|---|---|---|---|---|
| 3 | 0.25 | 1:1 | 2.1 | Ca |
| 4 | 0.25 | 1:1 | 2.1 | Ca |
| 5 | 0.25 | 1:1 | 3.9 | Ca |
| 6 | 0.25 | 1:2 | 8.3 | |

TABLE 3

| Item scored | Perfect score | Sample 1 | 2 | 3 | 4 | 5 | 6 |
|---|---|---|---|---|---|---|---|
| Volume | 10 | 6 | 7 | 9 | 6 | 7 | 7 |
| Crust and color | 2 | 2 | 2 | 2 | 2 | 1 | 1 |
| Break and shred | 3 | 2 | 2 | 2 | 2 | 2 | 2 |
| Slicing | 10 | 7 | 8 | 8 | 8 | 8 | 8 |
| Grain | 20 | 14 | 15 | 16 | 17 | 18 | 17 |
| Texture | 20 | 15 | 16 | 17 | 17 | 17 | 17 |
| Crumb color | 10 | 7 | 8 | 8 | 9 | 9 | 9 |
| Taste-aroma | 10 | 9 | 8 | 8 | 9 | 9 | 9 |
| Softness | 15 | 12 | 12 | 13 | 12 | 13 | 12 |
| Total score | 100 | 74 | 78 | 83 | 81 | 84 | 81 |

From the observed scores it was determined that the Samples 3, 4, 5 and 6, which included the dough additive of this invention, were of better quality than the control Samples 1 and 2.

From the appearance of the dough and the baked product, it was determined that the moisture level in the dough was below the optimum amount.

EXAMPLE 8

A yeast raised baked product was prepared from a dough comprising:

| Ingredient: | Percent |
|---|---|
| Flour | 100 |
| Water | 67.6 |
| Yeast | 2.5 |
| Mineral yeast food | 0.5 |
| Salt | 2.3 |
| Sugar | 8 |
| Shortening | 3.25 |
| Non-fat dry milk | 2 |
| Calcium acid phosphate | 0.2 |
| Oxidation solution (ADA*, and potassium bromate), 50 cc. | |
| Dough additive | As indicated |

*Azodicarbonamide.

The dough was prepared with a continuous bread making process. The sponge was allowed to ferment for about two and one-half hours. The dough was proofed for fifty minutes and baked in an oven at 425° F. for 18 minutes. The baked product including the dough additive was consistently observed to rate higher in all aspects than the control baked product having no additive. The baked product including the dough additive was observed to have a particularly high rating in compressibility (antistaling) at the end of four days. The proofed dough was subjected to a shock test simulating bakery conditions. The proofed dough including the dough additive was observed to have a superior resistance to the shock test.

The dough additives of this invention and quantities thereof used in this example were as stated in Table 4. Two dough improvers used by the baking industry, sodium stearyl fumarate and calcium stearoyl-2-lactylate, were each used at 0.5% concentrations for Samples 11 and 12 respectively.

TABLE 4

| Sample | Percent used | Citric acid: sorbitol, molar ratio | Percent free carboxyl | Salt |
|---|---|---|---|---|
| 8 | 0.25 | 2:1 | 30.5 | |
| 9 | 0.25 | 1:2 | 0.97 | Ca |
| 10 | 0.5 | 1:1 | 3.9 | Ca |

The baked products were evaluated and rated as shown in Table 5.

TABLE 5

| | Sample | | | | | |
|---|---|---|---|---|---|---|
| | 1 7 | 8 | 9 | 10 | 11 | 12 |
| Volume (cc.) | 2,200 | 2,775 | 2,725 | 2,650 | 2,650 | 2,500 |
| Crust color | VG | VG | VG | VG | VG | VG |
| Grain | G | EX | EX | EX | EX | VG |
| Texture | G | EX | EX | EX | EX | EX |
| Aroma | VG | EX | EX | EX | EX | VG |
| Taste | VG | EX | EX | EX | EX | VG |
| Shock test | 1⅞ | 1⅞ | 2½ | 2 | 2¼ | 2¼ |
| Torque | 70 | 60 | 50 | 65 | 55 | 55 |
| Compressibility: | | | | | | |
| 1st day | 12.5 | 22 | 21 | 23 | 19 | 16 |
| 2d day | 8 | 16 | 13 | 16 | 15 | 12 |
| 4th day | 6.5 | 14 | 9.5 | 11 | 13.5 | 9 |

1 Control.
NOTE.—G=Good; VG=Very Good; EX=Excellent.

The breads prepared with the process of this invention, Samples 8, 9 and 10, were clearly of superior quality compared to the control Sample 7. It was observed that the breads of Samples 8 and 9, prepared according to the process of this invention, were equal to or better than the bread of Samples 11 and 12 at bread additive levels 50% lower than recommended levels of dough improvers currently used in the baking industry.

EXAMPLE 9

A yeast raised baked product was prepared from a dough comprising:

| Ingredient: | Percent |
|---|---|
| Flour | 100 |
| Water | 64 |
| Lard | 3 |
| Yeast | 2.5 |
| Salt | 2.0 |
| Sugar | 2.0 |
| Milk | 2.0 |
| Yeast food | 0.5 |
| Calcium acid phosphate | 0.1 |
| Potassium iodate, 15 p.p.m. | |
| Potassium bromate, 60 p.p.m. | |
| Dough additive | As indicated |

The baked product was prepared according to the procedure of Example 8.

Sample 15 was the control and contained no additive. Samples 16 through 20 contained additives as stated in Table 6.

TABLE 6

| Sample | Percent used | Citric acid: sorbitol, molar ratio | Percent free carboxyl | Salt |
|---|---|---|---|---|
| 16 | 0.125 | 1:2 | 4.8 | Na |
| 17 | 0.125 | 1:1 | 2.7 | Na |
| 18 | 0.125 | 2:1 | 9.8 | Ca |
| 19 | 0.125 | 1:2 | 2.0 | Ca |
| 20 | 0.125 | 1:2 | 0.97 | Ca |

The resulting product was evaluated and scored according to the procedure of Example 7. The observed values are set forth in Table 7. These values indicated that the process of this invention was effective at dough additive concentrations substantially below the concentrations of the dough improvers used by the baking industry.

TABLE 7

| | Sample | | | | | |
|---|---|---|---|---|---|---|
| | 15 | 16 | 17 | 18 | 19 | 20 |
| Bread score | 90 | 93 | 90 | 91 | 88 | 91 |
| Compressibility | 52 | 57 | 55 | 55 | 56 | 56.3 |

What is claimed is:

1. In the preparation of a yeast raised baked product, the improvement comprising incorporating into the dough-forming ingredients prior to baking a dough additive, said dough additive consisting essentially of a polyester of citric acid and sorbitol or a physiologically acceptable alkali metal or alkaline earth metal salt thereof in which the molar ratio of citric acid to sorbitol is between 1:2 and 2:1, and said dough additive being present in an amount of at least 0.125%.

2. A method according to claim 1 in which the amount of dough additive used is between about 0.125% and 0.5%.

3. The method according to claim 1 in which the amount of dough additive used is 0.25%.

4. A method according to claim 1 in which the molar ratio of citric acid to sorbitol in the dough additive used is 1:2.

5. A method according to claim 1 in which the molar ratio of citric acid to sorbitol in the dough additive used 2:1.

6. A method according to claim 1 in which the polyester is in the form of a calcium or sodium salt thereof.

7. A method according to claim 1 in which the dough additive is incorporated in a sponge during the preparation of said sponge.

8. An improved yeast raised, flour dough, baked product having included therein, prior to baking, as an essential ingredient a dough additive consisting essentially of a polyester of citric acid and sorbitol or physiologically acceptable alkali metal or alkaline earth metal salts thereof in which the molar ratio of citric acid to sorbitol is between 1:2 and 2:1, and said dough additive being present in an amount of at least 0.125%.

9. A product according to claim 8 in which the amount of dough additive is between about 0.125% and 0.5%.

10. A product according to claim 8 in which the ratio of citric acid to sorbitol in the dough additive used is 1:2.

11. A product according to claim 8 in which the ratio of citric acid to sorbitol in the dough additive used is 2:1.

12. A yeast raised baked product according to claim 8 in which the polyester is in the form of a sodium or calcium salt thereof.

References Cited

UNITED STATES PATENTS 3,227,559  1/1966  Radlove _____ 99—91 X
3,362,829  1/1968  Landfried et al. _____ 99—91 X

OTHER REFERENCES

Perry, Chemical Engineers' Handbook, 3rd edition, 1950, p 845.

RAYMOND N. JONES, Primary Examiner

J. R. HOFFMAN, Assistant Examiner